US 12,420,837 B2

(12) United States Patent
Shi et al.

(10) Patent No.: US 12,420,837 B2
(45) Date of Patent: Sep. 23, 2025

(54) DETECTION OF SMALL OBJECTS UNDER AN AUTONOMOUS VEHICLE CHASSIS

(71) Applicant: TUSIMPLE, INC., San Diego, CA (US)

(72) Inventors: Zhujia Shi, San Diego, CA (US); Xiangchen Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 173 days.

(21) Appl. No.: 17/502,482

(22) Filed: Oct. 15, 2021

(65) Prior Publication Data

US 2022/0126870 A1 Apr. 28, 2022

Related U.S. Application Data

(60) Provisional application No. 63/105,699, filed on Oct. 26, 2020.

(51) Int. Cl.
| | |
|---|---|
| B60Q 9/00 | (2006.01) |
| B60W 10/06 | (2006.01) |
| B60W 10/18 | (2012.01) |
| B60W 10/20 | (2006.01) |
| B60W 30/09 | (2012.01) |
| B60W 60/00 | (2020.01) |
| G05D 1/00 | (2006.01) |

(52) U.S. Cl.
CPC ........ *B60W 60/0016* (2020.02); *B60W 10/06* (2013.01); *B60W 10/18* (2013.01); *B60W 10/20* (2013.01); *B60W 2300/145* (2013.01); *B60W 2552/35* (2020.02); *B60W 2710/06* (2013.01); *B60W 2710/18* (2013.01); *B60W 2710/20* (2013.01); *G05D 1/0214* (2013.01)

(58) Field of Classification Search
CPC ......... B60W 60/0016; B60W 2552/35; B60W 10/06; B60W 10/18; B60W 10/20; B60W 2300/145; B60W 2710/06; B60W 2710/18; B60W 2710/20; G05D 1/0214
See application file for complete search history.

(56) References Cited

U.S. PATENT DOCUMENTS

| 9,201,421 | B1 * | 12/2015 | Fairfield | G05D 1/0088 |
| 10,262,538 | B1 * | 4/2019 | Milovich | H04W 4/44 |
| 10,417,508 | B2 * | 9/2019 | Wei | G06V 20/58 |
| 11,170,589 | B2 * | 11/2021 | Hunt | G07C 5/085 |
| 2015/0210312 | A1 * | 7/2015 | Stein | B62D 6/00 |
| | | | | 701/41 |
| 2016/0339959 | A1 * | 11/2016 | Lee | B62D 15/0265 |

(Continued)

*Primary Examiner* — Scott A Browne
*Assistant Examiner* — Rami Nabih Bedewi
(74) *Attorney, Agent, or Firm* — Perkins Coie LLP

(57) ABSTRACT

An autonomous vehicle includes an under-chassis object detection system for identifying the presence of an object on a road that the autonomous vehicle is travelling upon. The under-chassis object detection system may include a LIDAR system. The object on the road that the autonomous vehicle is travelling upon is of a size that allows the vehicle's chassis to pass over the object on the road. The autonomous vehicle may react to the detected object on the road to operate the autonomous vehicle safely, such as by altering the vehicle's trajectory, by stopping the vehicle, or by communicating with a control center for further instructions.

16 Claims, 5 Drawing Sheets

(56) References Cited

U.S. PATENT DOCUMENTS

| | | | |
|---|---|---|---|
| 2018/0284787 A1* | 10/2018 | Naka | G05D 1/0257 |
| 2019/0176639 A1* | 6/2019 | Kumar | B60L 3/0046 |
| 2019/0250900 A1* | 8/2019 | Troia | G06F 8/65 |
| 2020/0050206 A1* | 2/2020 | Deyle | G01C 21/3461 |
| 2020/0183008 A1* | 6/2020 | Chen | G01S 17/89 |
| 2020/0257299 A1* | 8/2020 | Wang | G08G 1/167 |
| 2021/0027409 A1* | 1/2021 | Nair | H04N 23/60 |
| 2021/0192234 A1* | 6/2021 | Chen | B60W 60/001 |
| 2022/0289174 A1* | 9/2022 | Hashimoto | B60W 60/0015 |

* cited by examiner

DETECTION OF SMALL OBJECTS UNDER AN AUTONOMOUS VEHICLE CHASSIS

CROSS-REFERENCE TO RELATED APPLICATIONS

This application claims priority to provisional application No. 63/105,699, titled "DETECTION OF SMALL OBJECTS UNDER AN AUTONOMOUS VEHICLE CHASSIS," filed Oct. 26, 2020, the disclosures of which are hereby incorporated by reference herein.

TECHNICAL FIELD

The present disclosure relates generally to autonomous vehicles. More particularly, the present disclosure is related to detecting and reacting to objects of a size that allows a chassis of an autonomous vehicle to pass over the object on a road over which the autonomous vehicle is travelling.

BACKGROUND

One aim of autonomous vehicle technologies is to provide vehicles that can safely navigate towards a destination with limited or no driver assistance. In some cases, an autonomous vehicle may encounter objects of a size that allows a chassis of the autonomous vehicle to pass over the object on the road which the autonomous vehicle is travelling. Currently in such cases, sensors placed to allow an autonomous vehicle to navigate roads may not detect objects close to the surface of the road, possibly endangering the autonomous vehicle when it drives over such small objects.

SUMMARY

Detection of small objects that may fit under a vehicle's chassis is important for the operation of an autonomous vehicle to compliance with the law, as well as to ensure the safety of persons and property surrounding the autonomous vehicle. Systems and methods are described herein that allow an autonomous vehicle to detect the presence of small objects on the road over which the autonomous vehicle is travelling and adjust trajectory or velocity to ensure safe operation of the autonomous vehicle.

A system is provided that includes an autonomous vehicle (AV). The autonomous vehicle includes: an under-chassis object detection subsystem; an in-vehicle control computer with an under-chassis object detection module; and an autonomous control subsystem.

The following features may be present in the system in any reasonable combination. The autonomous vehicle may include a tractor-trailer and the under-chassis object detection subsystem includes a sensor mounted under the fifth wheel of a tractor portion of the tractor-trailer. In such implementations, the sensor may include any of a LIDAR unit, a radar unit, and a camera. The under-chassis object detection subsystem includes one or more sensors with a detection area that includes part of an area of road under a chassis of the autonomous vehicle. In such implementations, the one or more sensors of the under-chassis object detection subsystem includes any of: a LIDAR unit, a radar unit, and a camera. The system may include a driving operation module configured to receive data from the under-chassis object detection module and plan trajectory changes for the autonomous vehicle in response to objects detected and identified as hazardous by the under-chassis object detection module. The system may further include one or more vehicle control subsystems, each vehicle control subsystem configured to accept operating commands from the driving operation module, the one or more vehicle control subsystems comprising any of: an engine power output unit, a braking unit, a navigation unit, a steering unit, and an autonomous control unit. An autonomous control unit may be part of the system, and the autonomous control unit may be configured to: accept hazard information from the under-chassis object detection module; plan trajectory changes for the autonomous vehicle in response to the hazard information; and send operating commands to one or more vehicle control subsystems that include any of: an engine power output unit; a braking unit; a navigation unit; and a steering unit.

Provided in some implementations is a method that includes: sensing, by a sensor of an under-chassis object detection subsystem, an object on a road that an autonomous vehicle is travelling upon; transmitting, by the under-chassis object detection subsystem, data from the sensor to an in-vehicle control computer; and determining, by an under-chassis object detection module of the in-vehicle control computer, the presence of an object on the road, the object being of a size that allows a chassis of the autonomous vehicle to pass over the object on the road.

The following features may be part of the method in any reasonable combination. The method may further include modifying the trajectory or route of the autonomous vehicle to account for the presence of the object on the road. Determining a hazard level for the object on the road determined by the under-chassis object detection module may be part of the method. Such methods may include modifying the trajectory or route of the autonomous vehicle to account for the hazard level for the object on the road determined by the under-chassis object detection module. Determining a hazard level for the object on the road may include: determining a certainty value for the identification of the object on the road; sending data to an oversight system when the certainty value is below a threshold value; and identifying, by the oversight system, the object on the road with certainty. In such implementations, identifying the object on the road with certainty may include a determination by a human remote control operator (RCO); alternatively or additionally, identifying the object on the road may include receiving a determination from a human remote control operator. Determining a hazard level for the object on the road may include: determining, by the under-chassis detection module, that the identified object on the road is larger than a predetermined threshold size; determining, by the under-chassis detection module, that the identified object on the road is situated in a position that requires a change in trajectory by the autonomous vehicle; and determining, by the under-chassis detection module, that the identified object on the road is sharp, jagged, or otherwise a potential cause of a puncture or other damage to an underside of the autonomous vehicle or any tires of the autonomous vehicle. The method may include causing the autonomous vehicle to operate according to a determined course of action that is based on the determined hazard level for the object on the road. The method may include causing the autonomous vehicle to execute the modified trajectory or route that is based on the presence of the object on the road.

In some implementations, an autonomous vehicle is provided that includes an in-vehicle computing unit that has at least one processor and at least one memory. The at least one memory includes instructions which, when executed by the at least one processor, cause the at least one processor execute the method, as described herein. The autonomous vehicle may also include vehicle sensor subsystems with the under-chassis object detection subsystem; an autonomous control unit; and a means for network communications. Additionally, or alternatively, provided herein embodiments of an autonomous vehicle that includes an in-vehicle computing unit comprising at least one processor and at least one memory that include instructions which, when executed by the at least one processor, cause the at least on processor to execute a method. In such embodiments, the method includes sensing, by a sensor of an under-chassis object detection subsystem, an object on a road that an autonomous vehicle is travelling upon; transmitting, by the under-chassis object detection subsystem, data from the sensor to the in-vehicle control computer; and determining, by an under-chassis object detection module of the in-vehicle control computer, the presence of an object on the road, the object being of a size that allows a chassis of the autonomous vehicle to pass over the object on the road. The at least one memory of the autonomous vehicle may further include modifying the trajectory or route of the autonomous vehicle to account for the object on the road; and determining a hazard level for the object on the road determined by the under-chassis object detection module.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Vehicles traversing highways and roadways need to be aware of surrounding vehicles and obstacles. Described below in detail are systems and methods for the safe and lawful operation of an autonomous vehicle on a roadway, including the detection of small objects on a roadway over which the autonomous vehicle is travelling.

Autonomous Truck

Figure 1A:
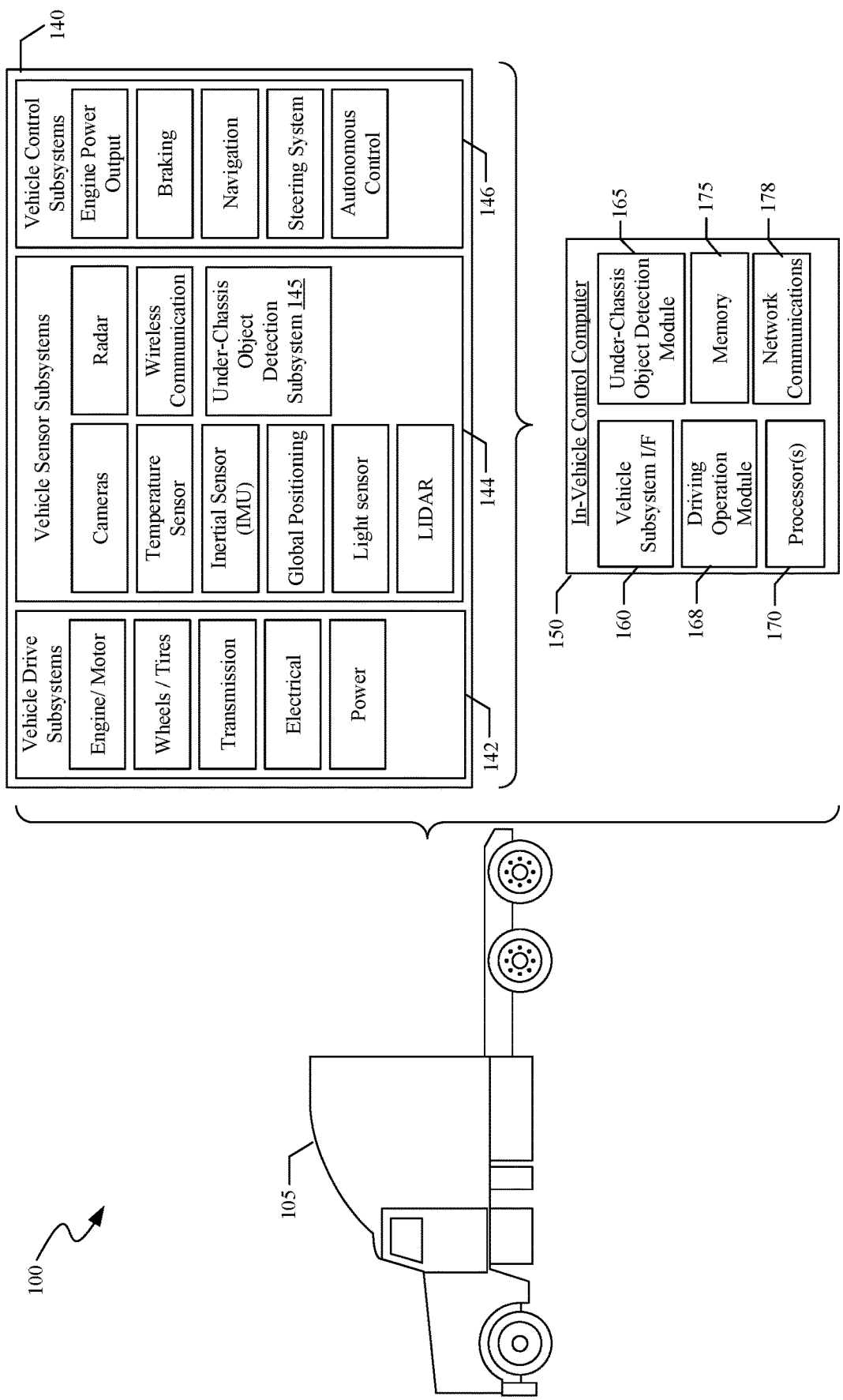
FIG. 1A illustrates a schematic diagram of a system including an autonomous vehicle.

FIG. 1A shows a system 100 that includes a tractor 105 of an autonomous truck. The tractor 105 includes a plurality of vehicle subsystems 140 and an in-vehicle control computer 150 The plurality of vehicle subsystems 140 includes vehicle drive subsystems 142, vehicle sensor subsystems 144, and vehicle control subsystems. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the tractor 105 moves. The tractor 105 may have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous truck 105 and an under-chassis object detection subsystem 145. The sensors for general operation of the autonomous vehicle may include cameras, a temperature sensor, an inertial sensor (IMU), a global positioning system, a light sensor, a LIDAR system, a radar system (radio detection and ranging system), and a wireless communications system.

Figure 1B:
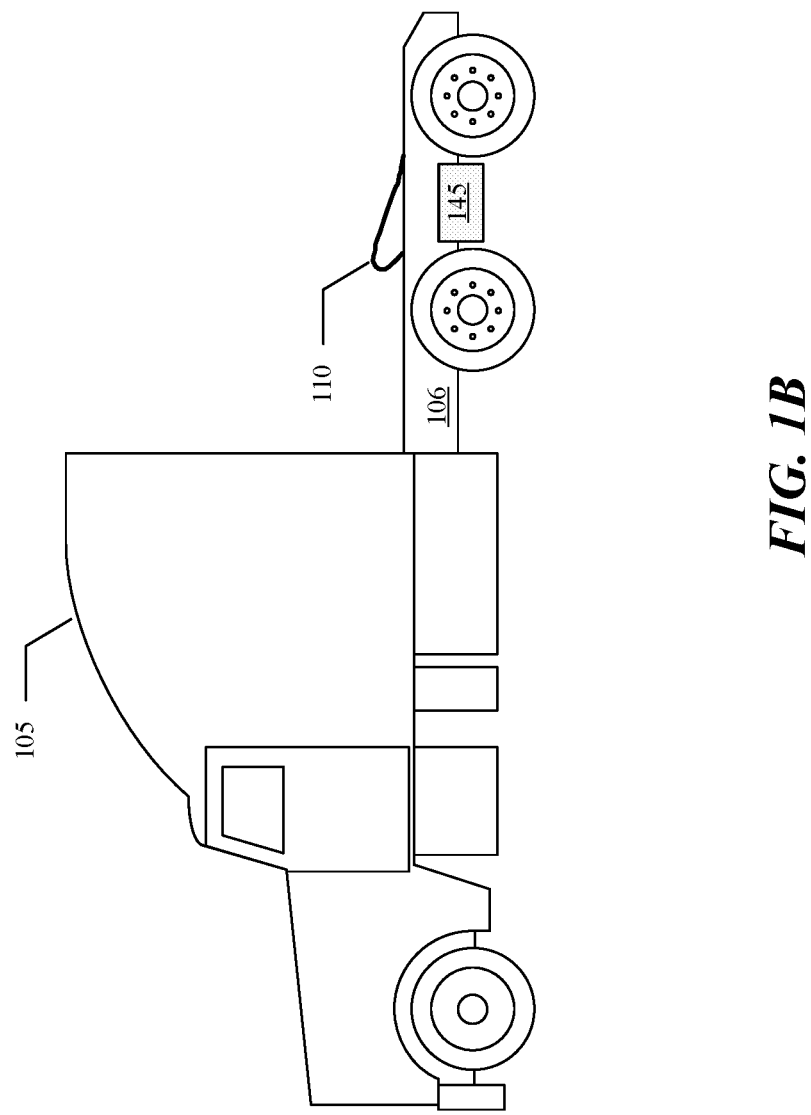
FIG. 1B illustrates an autonomous vehicle with an under-chassis detection subsystem including at least one sensor.

At least one sensor is associated with the under-chassis object subsystem 145. The sensor or sensors may be mounted specifically on the outside of the tractor portion of an autonomous truck 105. A LIDAR system (light detection and ranging system or a laser detection an ranging system) may be included in the sensor or sensors of the under-chassis object subsystem 145. Ideally, the sensor(s) of the under-chassis object subsystem 145 are mounted under a fifth wheel of the tractor portion of the autonomous truck 105. Alternatively, or additionally, the at least one sensor of the under-chassis object subsystem 145 may include a LIDAR system, a radar system, an ultrasonic sensor, or a camera. The sensor(s) of the under-chassis object subsystem 145 may be mounted to other locations on the tractor portion of the autonomous truck 105 in addition to, or in place of, under the fifth wheel or location where the tractor and trailer portions of the autonomous truck 105 are joined or connected. Such alternative mounting locations may include parts of the chassis of the tractor portion of the autonomous truck 105. FIG. 1B shows an autonomous truck 105 with an under-chassis object subsystem 145 located under the chassis 106 of the tractor portion of the autonomous truck, under the fifth wheel 110. The fifth wheel is generally located at the rear portion of a tractor and is where the trailer connects, or hitches, to the tractor. In some implementations, the under-chassis object subsystem may include sensors placed in other strategic locations on the chassis or portions of the vehicle body that are road-facing. Such locations may include those that are not impeded by the wheels or axels. The term under-chassis, as used herein may refer to any area beneath the chassis of a vehicle, such as an autonomous truck, or the area including the road-facing portions of a vehicle down to the surface over which the vehicle may travel (or is travelling). In some implementations, the area encompassed by the term under-chassis may include the area beneath a vehicle and extend beyond the front-end, rear-end, and sides of the vehicle, depending on the detection capabilities of sensors used in an under-chassis object detection subsystem.

The vehicle control subsystem 146 may be configured to control operation of the autonomous vehicle, or truck, 105 and its components. Accordingly, the vehicle control subsystem 146 may include various elements such as an engine power output subsystem, a braking unit, a navigation unit, a steering system, and an autonomous control unit. The engine power output may control the operation of the engine, including the torque produced or horsepower provided, as well as provide control the gear selection of the transmission. The braking unit can include any combination of mechanisms configured to decelerate the autonomous vehicle 105. The braking unit can use friction to slow the wheels in a standard manner. The braking unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the satellite-based global positioning device (e.g., GPS device) and one or more predetermined maps so as to determine the driving path for the autonomous vehicle 105. The steering system, or unit, may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LIDAR, the cameras, and/or other vehicle subsystems to determine the driving path or trajectory for the autonomous vehicle 105.

An in-vehicle control computer 150, which may be referred to as a VCU, includes a vehicle subsystem interface 160, a driving operation module 168, one or more processors 170, an under-chassis object detection module 165, a memory 175, and a network communications subsystem 178. This in-vehicle control computer 150 controls many, if not all, of the operations of the autonomous truck 105 in response to information from the various vehicle subsystems 140. The one or more processors 170 execute the operations associated with the under-chassis object detection module 165 that allow the system to determine that the autonomous vehicle may pass over a small object, such as road debris, traffic cones, and other objects of a size that allows the vehicle's chassis to pass over the object while the vehicle is on the road. The under-chassis object detection module 165 may also be able to identify irregularities in the road surface including cracks, potholes, and the like. Data from the under-chassis object detection subsystem 145 is provided to the under-chassis object detection module 165 so that the determination of authorities can be made. The under-chassis object detection module 165 may in turn determine what course of action should be taken by the autonomous truck 105. Alternatively, or additionally, the under-chassis object detection module 165 may pass data or information to the driving operation module 168, memory 175, or processors 170. Data from other vehicle sensor subsystems 144 is provided to the driving operation module 168 in addition to the information from the under-chassis object detection module 165 to determine a course of action to be taken when an object small enough to pass under the vehicle is encountered.

A course of action that an autonomous truck 105 can take in response to an object on the road surface may depend on the type of object detected. A size threshold may be applied that will dictate when the autonomous truck will change lanes or slow to avoid an object on the road. Alternatively, or additionally, a location criteria may be applied to the detected small object on the road which may cause the autonomous truck to slow down or change lanes. Once an object is detected, the in-vehicle control computer 150 may classify the identified object into different hazard levels. Each hazard level may require a different type of control protocol or behavior from the autonomous truck 105.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer (VCU) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the VCU 150 may send information to the vehicle control subsystems 146 to direct the trajectory, velocity, signaling behaviors, and the like, of the autonomous vehicle 105. The autonomous control vehicle control subsystem may receive a course of action to be taken from the under-chassis detection module 165 or the driving operation module 168 of the VCU 150 and consequently provide instructions to other subsystems to execute the course of action.

Figure 2:
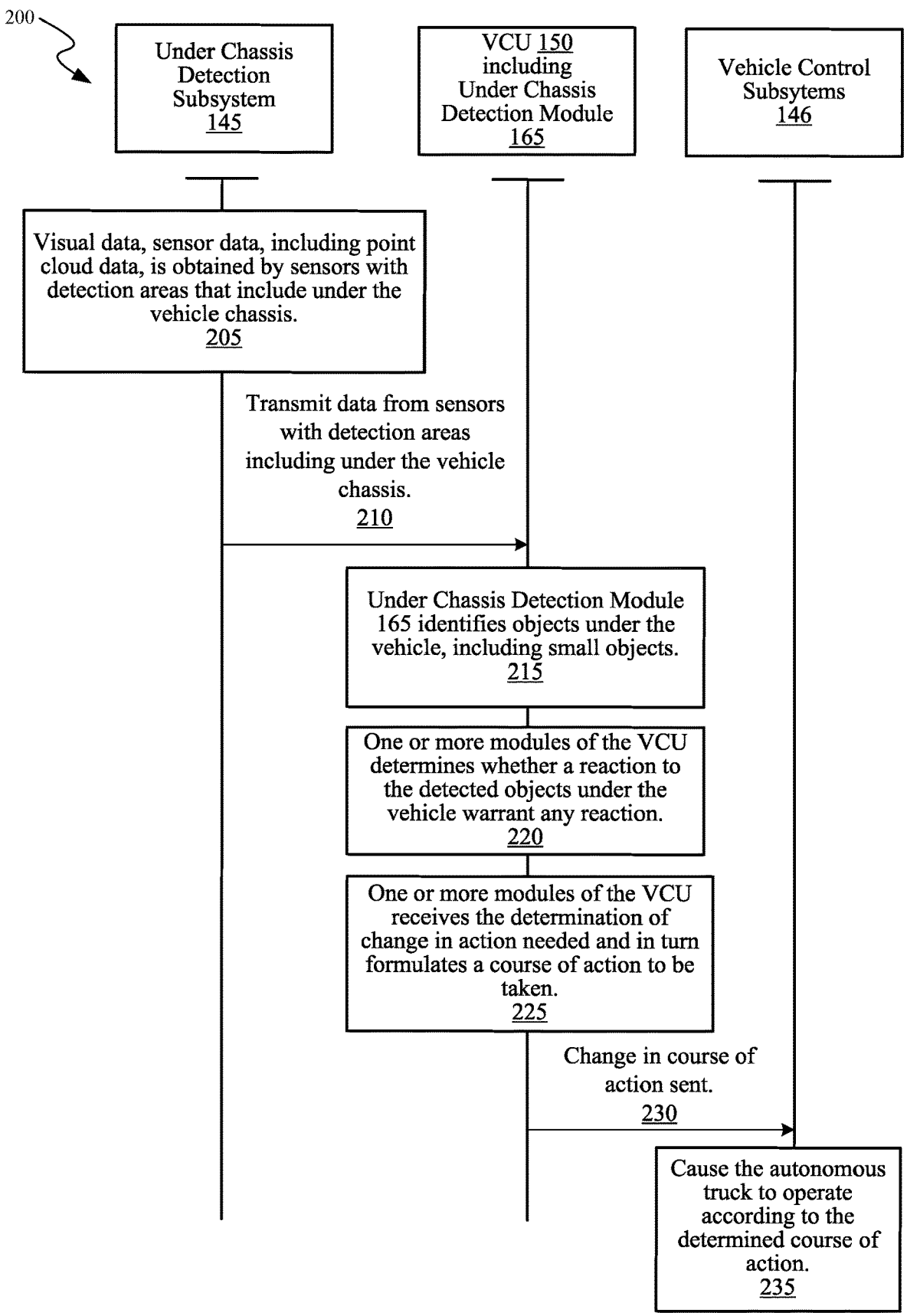
FIG. 2 shows a flow diagram for operation of an autonomous vehicle (AV) safely in light of the health and surroundings of the AV.

FIG. 2 shows a flow diagram 200 for the general operation of an autonomous vehicle (AV) safely in light of the health and surroundings of the AV. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

As shown in FIG. 2, the vehicle sensor subsystem 144 receives visual, auditory, or both visual and auditory signals indicating the environmental condition of the AV, as well as vehicle health or sensor activity data are received in step 205. These visual and/or auditory signal data are transmitted from the vehicle sensor subsystem 144 to the in-vehicle control computer system (VCU) 150, as in step 210. Any of the driving operation module and the compliance module receive the data transmitted from the vehicle sensor subsystem, in step 215. Then, one or both of those modules determine whether the current status of the AV can allow it to proceed in the usual manner or that the AV needs to alter its course to prevent damage or injury or to allow for service in step 220. The information indicating that a change to the course of the AV is needed may include an indicator of sensor malfunction; an indicator of a malfunction in the engine, brakes, or other components necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the AV's course of action is needed may be used by the compliance module to formulate a new course of action to be taken which accounts for the AV's health and surroundings, in step 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in step 230. The vehicle control subsystems 146 then cause the autonomous truck 105 to operate in accordance with the course of action to be taken that was received from the VCU 150 in step 235.

Autonomous Truck Oversight System

Figure 3:
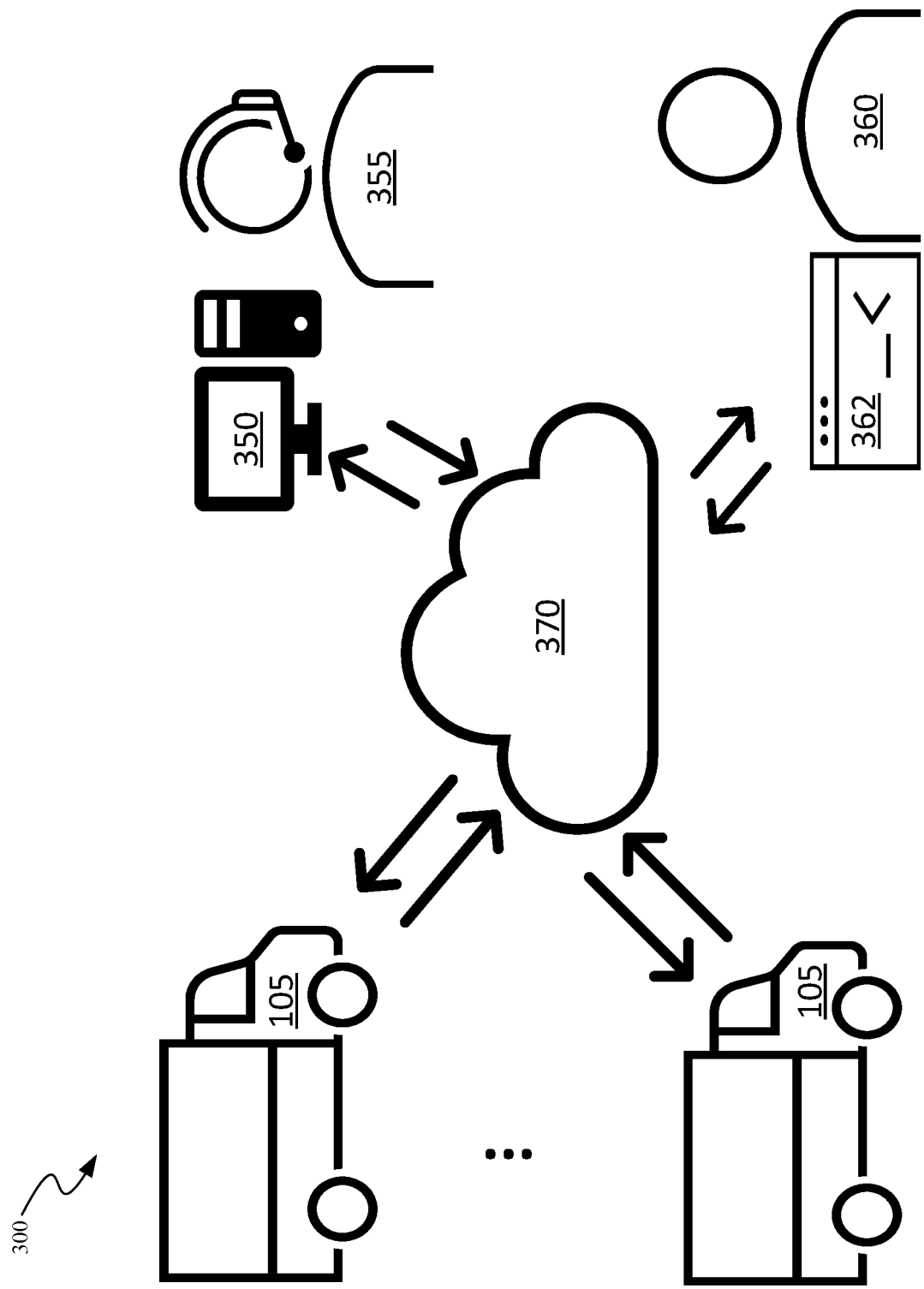
FIG. 3 illustrates a system that includes one or more autonomous vehicles, a control center or oversight system with a human operator (e.g., a remote center operator (RCO)), and an interface for third-party interaction.

FIG. 3 illustrates a system 300 that includes one or more autonomous vehicles 105, a control center or oversight system 350 with a human operator 355, and an interface 362 for third-party 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1A, the VCU 150 of each autonomous vehicle 105 may include a module for network communications 178.

An autonomous truck may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous trucks in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous trucks to keep all components up to date; and other purposes or functions that improve the safety for the autonomous vehicle, its cargo, and its surroundings.

An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver and monitoring the vehicle's progress during the MRC maneuver; when to hand over control of the autonomous vehicle to a human driver (e.g., at a destination yard); ensuring an autonomous vehicle performs or conforms to legal requirements at checkpoints and weight stations; give feedback regarding the identification of an object over which an autonomous vehicle passes while in transit and it unable to identify with high certainty, and the like.

To allow for communication between autonomous vehicles in a fleet and an oversight system or command center, each autonomous vehicle may be equipped with a communication gateway. The communication gateway may have the ability to do any of the following: allow for AV to oversight system communication (i.e. V2C) and the oversight system to AV communication (C2V); allow for AV to AV communication within the fleet (V2V); transmit the availability or status of the communication gateway; acknowledge received communications; ensure security around remote commands between the AV and the oversight system; convey the AV's location reliably at set time intervals; enable the oversight system to ping the AV for location and vehicle health status; allow for streaming of various sensor data directly to the command or oversight system; allow for automated alerts between the AV and oversight system; comply to ISO 21434 standards; and the like.

An oversight system or command center may be operated by one or more human, also known as an operator or a remote center operator (RCO). The operator may set thresholds for autonomous vehicle health parameters, so that when an autonomous vehicle meets or exceeds the threshold, precautionary action may be taken. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of Such situations may include: irregular or sudden changes in traffic flow (e.g., traffic jam or accident); emergency conditions (e.g., fire, sink-hole, bridge failure, dangerous debris along a route); large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems (e.g., unable to obtain a clear image or inability of analysis module to confidently identify an object in an image) or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform a MRC maneuver and subsequently send such instructions to the affected vehicle. In these cases, each autonomous vehicle receiving either information or instructions from the oversight system or the oversight system operator uses its on-board computing unit (i.e. VCU) to determine how to safely proceed, including performing a MRC maneuver that includes pulling-over or stopping.

An oversight system or command center may allow a third party to interact with the oversight system operator, with an autonomous truck, or with both the human system operator and an autonomous truck. A third party may be a customer whose goods are being transported, a law enforcement or emergency services provider, or a person assisting the autonomous truck when service is needed.

Method for Operating an Autonomous Truck

A method for operating an autonomous truck with an under-chassis object detection system may include the data transmission and processing by modules on the autonomous truck and/or by an oversight system. The under-chassis object detection subsystem of an autonomous truck senses a small object or imperfection on a road over which the autonomous truck is travelling. The signal data from the under-chassis object detection subsystem are transmitted from the under-chassis object detection subsystem to the in-vehicle control computer system (VCU). In the in-vehicle control computer system, the under-chassis object detection module receives the data transmitted from the under-chassis object detection system. Then, the under-chassis object detection module produces passes information about the small object detected to other components of the VCU to formulate a course of action to be taken. The course of action to be taken may include maintaining speed and direction, slowing, stopping, moving into a shoulder, changing route, changing lane while staying on the same general route, and the like. The course of action to be taken may include initiating communications with any oversight or human interaction systems present on the autonomous vehicle. The course of action to be taken is then transmitted from the VCU 150 to the various vehicle control subsystems. The vehicle control subsystems then cause the autonomous truck to operate in accordance with the course of action to be taken that was received from the VCU.

Figure 4:
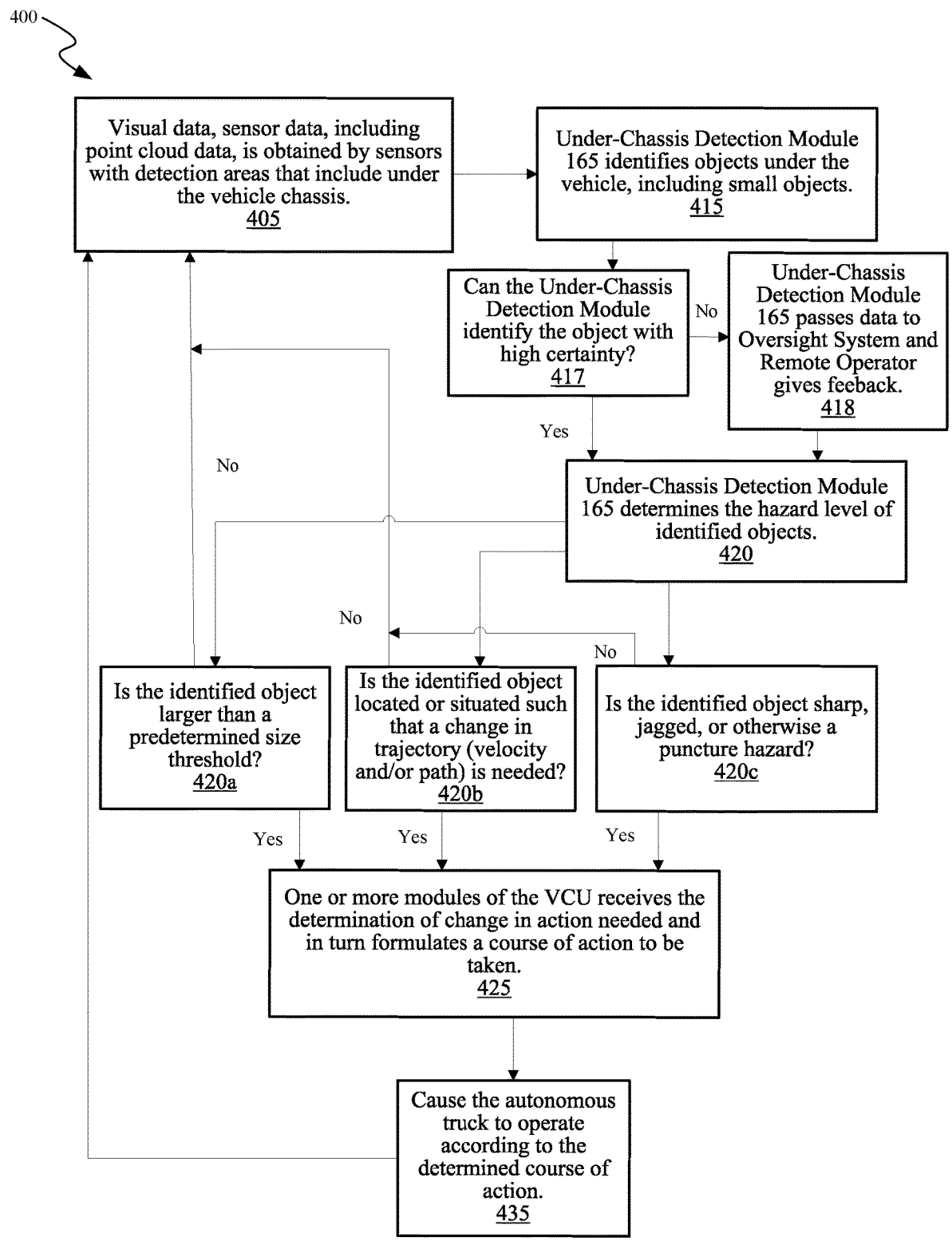
FIG. 4 shows a flow diagram for operation of an autonomous vehicle (AV) with an under-chassis object detection system.

FIG. 4 shows a flow diagram 400 for a method for operating an autonomous vehicle, particularly an autonomous truck, with an under-chassis object detection system and an on-board computing unit with an under-chassis detection module. The under-chassis object detection system includes one or more sensors that monitor an area that includes part of the roadway under the chassis of the autonomous vehicle. In the case of an autonomous truck, that could include the area under the tractor chassis or under the trailer. Visual data, sensor data, including point cloud data, is obtained by sensors with detection areas that include under the vehicle chassis in step 405 of the shown method. This data is sent from the sensor(s) to the under-chassis detection module and objects are identified by the module in step 415. The identified objects can include small objects on the surface of the roadway or imperfections in the roadway. A determination may be made about the certainty with which the under-chassis detection module is able to identify an object from the sensor data. When the certainty level of the object identification is below a threshold amount, the autonomous vehicle may contact an oversight system (e.g., remote control center) and send the sensor data for object identification, as in step 418. The oversight system may have a remote operator (RCO, described above), who can identify an object or multiple object from the sensor data. The identified objects are sent from the oversight system, or remote control center, back to the autonomous vehicle. Alternatively, when the under-chassis detection module is able to identify an object on the roadway from the sensor data, information about the identified object can be used by the under-chassis detection module to determine a hazard level of the identified object directly. Once the under-chassis detection module has information about the identified object on the road from either the oversight system or based on the identification made by the module, a hazard level of the identified object may be made, as in step 420. The hazard level determination may include determining whether the identified object fulfills the following criteria. When any of the criteria is met, then a change in the trajectory of the autonomous vehicle, either the velocity or path, may be needed. When none of the criteria are met, then no change in trajectory of the autonomous vehicle is needed and the under-chassis object detection subsystem continues to provide sensor data to the system. A criteria used to evaluate hazard level is that the identified object on the road surpasses a predetermined size threshold, shown in step 420*a*. Another criteria is that the identified object on the road is located or situated such that a change in vehicle trajectory, either or both speed and direction, is needed in step 420*b*. A third criteria is that the identified object on the road is sharp, jagged, or otherwise a potential cause of a puncture or other damage to the underside of the vehicle or the tires, as in step 420*c*. Once the hazard level determination has been made by the under-chassis detection module, this module will indicate to various module of the VCU that a change in the trajectory or action of the autonomous vehicle is needed. In step 425, the modules of the VCU receiving the information from the under-chassis object detection module that a change of action by the autonomous vehicle is needed will then proceed to determine, calculate, or formulate a course of action to be taken. Alternatively, the under-chassis object detection module may indicate to the autonomous driving unit of the control subsystems that a change of trajectory or action is needed, and the autonomous driving unit (e.g., autonomous control unit) may formulate or determine the course of action to be taken. The course of action to be taken in response to the identified object on the road may then be implemented, as in step 435, by one or more vehicle control subsystems of the autonomous vehicle. The vehicle control subsystems which may allow the autonomous vehicle to avoid or compensate for the presence of the identified object on the road may include any of: an engine power output unit, a braking unit, a navigation unit, a steering system, and an autonomous control unit. While the autonomous vehicle proceeds on the road, either in response to a detected object on the road or according to the safest manner to proceed on its route absent road debris or imperfections, the under-chassis detection subsystem will continue to collect data and pass it to the under-chassis detection module for analysis.

When encountering road debris or object which the autonomous truck may pass over, the under-chassis object detection module may identify or classify objects based on size or dimensions. Object that may be detected by an autonomous truck with an under-chassis object detection subsystem and an under-chassis object detection module include: tire treads, small objects, medium objects, small pedestrians, static object, moving objects, an object that could be detected by one or more sensors mounted under the fifth wheel of tractor-trailer, and the like.

An autonomous truck as described herein may be able to detect and classify tire treads on the roadway that are taller than a first predetermined dimension (e.g., 10 cm (3.94 in), 15 cm (5.91 in.), 20 cm (8 in)) or longer than a second predetermined dimension (e.g., 15 cm (5.91 in), 30 cm (11.8 in.), 45 cm (17.7 in)) from at least a predetermined distance (e.g., from at least 90 meters, 100 meters, 110 meters, 120 meters) on the autonomous truck's projected path of travel and on any lane or shoulder adjacent to that path using data from all of the sensor subsystems of the autonomous truck.

The autonomous truck may be able to detect objects with height between two predetermined lengths (e.g., between 10 cm (3.94 in.) and 15 cm (5.91 in.), between 15 cm (5.91 in.), 20 cm (8 in)) from at least a predetermined distance on autonomous truck's projected path of travel (e.g., from at least 70 m, 80 m, 90 m, 100 m, 110 m, 120 m) and on any lane or shoulder adjacent to the path of the autonomous truck using data from all of the sensor subsystems of the autonomous truck; such object may be classified by the autonomous truck as a small object. A small object may be any of: an animal, remains of an animal, a conveyance, parts of a conveyance, a box, a bag of any content, and any debris that conforms to the predetermined size range for a small object.

The autonomous truck may be able to detect objects with height between two predetermined lengths (e.g., between 15 cm (5.91 in.) and 25 cm (9.81 in.), 20 cm (8 in) and 30 cm (11.8 in)) from at least a predetermined distance on the autonomous truck's projected path of travel (e.g., from at least 70 m, 80 m, 90 m, 100 m, 110 m, 120 m) and on any lane or shoulder adjacent to the path of the autonomous truck using data from all of on-vehicle the sensor subsystems; such an object may be determined to be a medium-sized object. A medium-sized object may be any of: an animal, remains of an animal, a conveyance, parts of a conveyance, a ladder, a box, a disabled conveyance, a bag of any content, and any debris that conforms to the predetermined size range for a medium-sized object.

An autonomous truck may be able to detect objects with height between two predetermined lengths (e.g., between 25 cm (9.81 in.) and 40 cm (15.75 in.), between 30 cm (11.8 in) and 50 cm (19.62 in)) from at least a predetermined distance on the projected path of travel (e.g., from at least 100 m, 110 m, 120 m, 130 m, 140 m) and on any lane or shoulder adjacent to the autonomous truck's path; such an object may be identified as a large object. A large object may be any of: an animal, remains of an animal, a conveyance, parts of a conveyance, a ladder, a box, a disabled conveyance, a bag of any content, and any debris that conforms to the predetermined size range for a large object.

Additionally, or optionally, an autonomous truck may identify an extra-large object as an object with a height greater than a predetermined length (e.g., greater than 40 cm (15.75 in.) from more than a distance that is far enough to allow the autonomous truck to come to a complete stop or a predetermined distance (e.g., 125 meters, 150 meters, 175 meters) whichever distance is greater. An extra-large object may be any of: an animal, remains of an animal, a conveyance, parts of a conveyance, a ladder, a box, a disabled conveyance, a skateboard, a bicycle, a motorcycle, a scooter, a bag of any content, and any debris that conforms to the predetermined size threshold for an extra-large object.

In response to identifying an object, an autonomous truck may alter its trajectory, stop all together, or determine that it is safe to proceed along its original path or route. In some implementations, when an object is detected in the path of the autonomous truck (e.g., autonomous vehicle), the autonomous truck may come to a complete stop before reaching the detected object. Alternatively, or additionally, the autonomous truck may slow down before reaching the detected object. Further, a static or moving object of a predetermined height approximating the height of a two-year old human, such as about 32 inches (0.8128 meters), including about 34 inches, 36 inches, and even 37 inches detected by the autonomous truck may cause the autonomous truck to change lanes, slow down, stop before reaching the object, or otherwise alter trajectory (e.g., speed and/or direction). The autonomous truck may preferably avoid coming into contact with any moving unknown objects, excluding flying debris. For detected static objects, an autonomous truck may straddle, or pass over, object which are shorter than the ground clearance of the truck's front bumper and narrower than the minimum wheel inside spacing across all of the autonomous truck's axles. Further, an autonomous truck may be able to identify when it impacts an object, and whether or not the object causes damage to the autonomous truck. Damage may include vehicular body damage, a loss of tire pressure, a loss of fuel pressure, a loss of oil pressure, and any other mechanical or electrical deviation from normal operating conditions. Additionally, an autonomous truck may contact an oversight system, or a remote control operator, when the autonomous truck collides with an object or notes debris in the roadway. This information may be relayed to trucks that have yet to pass over that portion of the roadway by either the oversight system or the autonomous truck that first encountered the debris.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

The description and figures of this document include tractor-trailer type vehicles. The methods and systems described herein may apply to or include other autonomous vehicles that operate on roadways, including other towing vehicles, passenger vehicles, and the like.

The description and figures of this document may utilize acronyms for sensor systems including GPS, LIDAR, LiDAR, radar, Radar, IMU (inertial measurement unit), and the like. For acronyms which there is a difference in capitalization (e.g., LIDAR, LiDAR, lidar), these acronyms should not be limited to any one specific variety of sensing technology, but rather may encompass the various types of sensing technologies generally associated with each acronym.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
receiving, by an in-vehicle control computer, data sensed by a sensor located on an autonomous vehicle, wherein the sensor senses an object on a road that the autonomous vehicle is travelling upon;
determining that a trajectory of the autonomous vehicle is to be changed in response to determining that the object has a size that does not allows a chassis of the autonomous vehicle to pass over the object on the road, wherein the object is determined to have a height greater than a predetermined value when the autonomous vehicle is located at a distance from the object greater than a pre-determined distance;
determining a course of action to be taken by the autonomous vehicle in response to determining that the trajectory of the autonomous vehicle is to be changed;
sending, to one or more devices in the autonomous vehicle, instructions that cause the autonomous vehicle to steer according to the course of action;
determining a certainty value for an identification of the object on the road;
sending data to an oversight system when the certainty value is below a threshold value;
identifying, by the oversight system, the object on the road with certainty; and
transmitting, to other vehicles that have yet to pass over a portion of the road where the object is located, information of the object whose certainty value for the identification is below a threshold value;
determining when the autonomous vehicle collided with the object;
determining that the object causes damage to the autonomous vehicle, wherein the damage caused by the object comprises at least one of: a loss of fuel pressure or a loss of oil pressure of the autonomous vehicle;
transmitting information that indicates that the autonomous vehicle collided with the object.

2. The method of claim 1, wherein the course of action includes moving the autonomous vehicle into a shoulder of the road.

3. The method of claim 1, further comprising:
determining that a shape of the object on the road is a potential cause of a puncture or other damage to an underside of the autonomous vehicle or any tires of the autonomous vehicle.

4. The method of claim 1, further comprising:
determining that the object on the road is situated in a position that requires a change in the trajectory by the autonomous vehicle.

5. The method of claim 1, further comprising:
transmitting, to other vehicles that have yet to pass over a portion of the road where the object is located, information of the damage caused by the object.

6. The method of claim 1, further comprising:
pushing over, by the oversight system, air updates to the autonomous vehicle to keep components up to date.

7. The method of claim 1, further comprising:
determining, by the oversight system, performance parameters of an autonomous vehicle, wherein the performance parameters comprise at least one of:
data logging frequency;
compression rate; or
communication prioritization.

8. The method of claim 7, wherein the performance parameters further comprise at least one of:
how frequently to service the autonomous vehicle; or
when to perform a minimal risk condition (MRC) maneuver.

9. The method of claim 1, further comprising:
monitoring, by the oversight system, law enforcement activity on the road, wherein the law enforcement activity comprises car chase or road clearing activity; and
sending, by the oversight system, the law enforcement activity to the autonomous vehicle.

10. An autonomous vehicle comprising a computer, comprising:
at least one processor; and
at least one memory including instructions which, when executed by the at least one processor, cause the at least one processor to execute a method, the method comprising:
receiving, by an in-vehicle control computer, data sensed by a sensor located on the autonomous vehicle, wherein the sensor senses an object on a road that the autonomous vehicle is travelling upon;
determining that a trajectory of the autonomous vehicle is to be changed in response to determining that the object has a size that does not allows a chassis of the autonomous vehicle to pass over the object on the road, wherein the object is determined to have a height greater than a predetermined value when the autonomous vehicle is located at a distance from the object greater than a pre-determined distance;
determining a course of action to be taken by the autonomous vehicle in response to determining that the trajectory of the autonomous vehicle is to be changed;
sending, to one or more devices in the autonomous vehicle, instructions that cause the autonomous vehicle to steer according to the course of action;
determining a certainty value for an identification of the object on the road;
sending data to an oversight system when the certainty value is below a threshold value;
identifying, by the oversight system, the object on the road with certainty; and
transmitting, to other vehicles that have yet to pass over a portion of the road where the object is located, information of the object whose certainty value for the identification is below a threshold value;
determining when the autonomous vehicle collided with the object;
determining that the object causes damage to the autonomous vehicle, wherein the damage caused by the object comprises at least one of: a loss of fuel pressure or a loss of oil pressure of the autonomous vehicle;
transmitting information that indicates that the autonomous vehicle collided with the object.

11. The autonomous vehicle of claim 10, wherein the course of action includes moving the autonomous vehicle into a shoulder of the road.

12. The autonomous vehicle of claim 10, wherein the at least one processor is caused to execute the method that further comprises:
determining that a shape of the object on the road is a potential cause of a puncture or other damage to an underside of the autonomous vehicle or any tires of the autonomous vehicle.

13. The autonomous vehicle of claim 10, wherein the at least one processor is caused to execute the method that further comprises:
determining that the object on the road is situated in a position that requires a change in the trajectory by the autonomous vehicle.

14. A non-transitory computer readable program storage medium having code stored thereon, the code, when executed by a processor, causing the processor to implement a method, comprising:
receiving, by an in-vehicle control computer, data sensed by a sensor located on an autonomous vehicle, wherein the sensor senses an object on a road that the autonomous vehicle is travelling upon;

determining that a trajectory of the autonomous vehicle is to be changed in response to determining that the object has a size that does not allows a chassis of the autonomous vehicle to pass over the object on the road, wherein the object is determined to have a height greater than a predetermined value when the autonomous vehicle is located at a distance from the object greater than a pre-determined distance;

determining a course of action to be taken by the autonomous vehicle in response to determining that the trajectory of the autonomous vehicle is to be changed;

sending, to one or more devices in the autonomous vehicle, instructions that cause the autonomous vehicle to steer according to the course of action;

determining a certainty value for an identification of the object on the road;

sending data to an oversight system when the certainty value is below a threshold value;

identifying, by the oversight system, the object on the road with certainty; and transmitting, to other vehicles that have yet to pass over a portion of the road where the object is located, information of the object whose certainty value for the identification is below a threshold value;

determining when the autonomous vehicle collided with the object;

determining that the object causes damage to the autonomous vehicle, wherein the damage caused by the object comprises at least one of: a loss of fuel pressure or a loss of oil pressure of the autonomous vehicle;

transmitting information that indicates that the autonomous vehicle collided with the object.

15. The non-transitory computer readable program storage medium of claim 14, wherein the course of action includes moving the autonomous vehicle into a shoulder of the road.

16. The non-transitory computer readable program storage medium of claim 14, wherein the method further comprises:

determining that a shape of the object on the road is a potential cause of a puncture or other damage to an underside of the autonomous vehicle or any tires of the autonomous vehicle.

\* \* \* \* \*